United States Patent [19]
Krause

[11] Patent Number: 4,714,315
[45] Date of Patent: Dec. 22, 1987

[54] METHOD FOR CONNECTING ELEMENTS OF OPTICAL COMMUNICATION TECHNOLOGY TO ONE ANOTHER OR TO ELEMENTS OF RELEASABLE PLUG CONNECTIONS

[75] Inventor: Dieter Krause, Munich, Fed. Rep. of Germany

[73] Assignee: Siemens Aktiengesellschaft, Berlin and Munich, Fed. Rep. of Germany

[21] Appl. No.: 787,112

[22] Filed: Oct. 15, 1985

[30] Foreign Application Priority Data

Oct. 24, 1984 [DE] Fed. Rep. of Germany ....... 3438340

[51] Int. Cl.$^4$ .............................................. G02B 6/36
[52] U.S. Cl. ............................... 350/96.20; 350/96.10; 350/96.21; 219/121 LC
[58] Field of Search ............... 350/96.20, 96.21, 96.22, 350/320; 250/227; 357/74; 219/121 LC, 121 LD, 121 LY

[56] References Cited

U.S. PATENT DOCUMENTS

| | | | |
|---|---|---|---|
| 4,030,811 | 6/1977 | Khoe .................................. | 350/96.20 |
| 4,350,867 | 9/1982 | Kinoshita et al. ........ | 219/121 LY X |
| 4,403,243 | 9/1983 | Hakamada ......................... | 350/96.20 |
| 4,500,165 | 2/1985 | Scholl et al. ...................... | 350/96.20 |
| 4,506,108 | 3/1985 | Kersch et al. ............ | 219/121 ED X |
| 4,615,031 | 9/1986 | Eales et al. .................. | 350/96.20 X |
| 4,623,220 | 11/1986 | Grabbe et al. .................... | 350/96.20 |

FOREIGN PATENT DOCUMENTS

0091738 10/1983 European Pat. Off. .
2704140 8/1978 Fed. Rep. of Germany .

OTHER PUBLICATIONS

Abstract of Japanese Patent Application 57 118 212, *Patent Abstracts of Japan*, vol. 6, No. 212, Oct. 6, 1982.

*Primary Examiner*—William L. Sikes
*Assistant Examiner*—Akm E. Ullah
*Attorney, Agent, or Firm*—Hill, Van Santen, Steadman & Simpson

[57] ABSTRACT

Optical elements, which are to be connected to one another such as laser diodes, coupling optics and/or optical fibers and plug cylinders, are first secured to weldable adjustment members which are then displaced relative to one another with the coupling faces lying against one another without play until a desired position is reached and then are subsequently secured to each other by at least one spot weld in a region of a part seam formed by edges of the coupling faces by either laser beam welding or electron beam welding with the spot weld being positioned to obtain a high fixing precision and being spaced inwardly from a circle circumscribing the contour of the coupling face. The securing by the spot weld is both stable in time and also climate-resistant. The assembly is particularly suitable for the manufacture of optical transmitter modules and for plug parts of releasable plug connectors of light waveguides.

17 Claims, 32 Drawing Figures

METHOD FOR CONNECTING ELEMENTS OF OPTICAL COMMUNICATION TECHNOLOGY TO ONE ANOTHER OR TO ELEMENTS OF RELEASABLE PLUG CONNECTIONS

BACKGROUND OF THE INVENTION

The present invention relates to a method for connecting elements of optical communication technology either one to another or to releasable plug connections wherein the elements are first connected to weldable adjustment members, the adjustment members are then displaced relative to one another with the coupling faces lying against one another without play until the desired adjusted position is reached, and subsequently the adjusted members are welded to one another in the region of the separating seam which is formed by the edges of the coupling faces. The invention is also directed to a releasable plug connection and to an optical transmitter module connected to an optical waveguide.

In the manufacture of optical transmitter modules, the desired coupling position must be provided between a laser diode and a coupling-in optics allocated to a light waveguide. This coupling position guarantees an optimum transmission of the light emitting by the laser diode into the light waveguide. In the manufacture of plug parts for releasable connections of light waveguides, a coupling position must be produced between a plug cylinder and an optical fiber and this coupling position guarantees that the core of the optical fiber is aligned exactly centrally relative to the outside circumference of the plug cylinder and thus only optimum coupling losses will occur in the finished plug connection. In both cases, the adjustment of the desired coupling position requires dimension precisions, which lie in the sub-micrometer range whereby the adjusted coupling position must remain positionably stable during the connection of the respective element and thereafter. In addition, the long-term stability in a time period of $10^5$ hours and a climate stability range which will be specified as 70% relative humidity at a temperature of 40° C. and with temperature fluctuations in the range of between $-10°$ C. and 75° C. are demanded for the fixed coupling position. Gluing methods and soldering methods are employed for fixing the coupled position or, respectively, for connecting the respective elements in the coupling position but the demands made can only be conditionally met with these gluing and soldering methods. In addition, adhesives have the disadvantage that they shrink greatly, that they have a high coefficient of thermal expansion and that they also react in an extreme sensitive way to humidity and heat. Solder connections, which creates high thermal stress of the element during the soldering process, also tend to creep easily under mechanical stresses.

A method for manufacturing the plug parts for releasable plug connections of light waveguides wherein the optical fibers are first secured in a central bore of a hollow cylindrical adjustment member are disclosed in German OS No. 2,704,140. In this method, the adjustment member is provided with a cylindrical collar whose back annular surface forms a coupling surface set back relative to an end face of the optical fiber. The coupling surface has a second coupling surface allocated to it and the second surface is formed by an end face of a plug cylinder, which has a structure of a hollow cylinder. The adjustment member is then inserted into the plug cylinder so that the two coupling surfaces lie against one another and both parts can be dislocated relative to one another until the desired adjusted position, which has the core of the optical fiber aligned precisely and centrally relative to the outside circumference of the plug, is obtained. After this adjusted position is reached, the adjustment member is then fixed in the plug cylinder whereby this fixing is undertaken, for example, by gluing, soldering or welding. For finishing a complete plug connection, two plug parts, which may be manufactured in such a fashion, are inserted into a common sleeve and pressure against one another until the end faces of the optical fibers lie against one another.

A method of manufacturing optical transmitter modules in which a light waveguide and coupling optics are first fixed in a housing is disclosed in an Abstract of Japanese Patent application No. 57 118 212, which appeared in "Patents Abstracts of Japan", Vol. 6, No. 212, Oct. 26, 1982. As disclosed, a semiconductor diode is secured in an annular mount. The housing and the mount are then shifted relative to one another in an axial direction of the light waveguide and in two directions perpendicular thereto until the desired adjusted position with an optimum of light transmission is reached. An axially displaceable welding ring is disposed on a continuation of the housing and is then moved until it is seated against the mount. To fix the adjusted position, the ring is welded both to the mount as well as to the housing. The two welds respectively proceed over the entire circumference of the ring and are produced by means of a laser beam welding process.

When joining elements of optical communication technology to one another or to elements of releasable connections, a fixing or welding of the parts at an established adjusted position by laser beam welding has the advantage that the thermal load on the parts to be connected is low and that the fixing is long-term stable and climate-resistant. On the other hand, a welding warp, which prevents a fixing with a dimensional precision in the sub-micrometer range, will occur during this welding operation.

SUMMARY OF THE INVENTION

The object of the present invention is to create a method for connecting elements of optical communication technology to one another or to elements of a releasable plug connection wherein the elements to be connected are adjusted relative to one another with dimensional precision in the submicrometer range and are durably fixed in the achieved adjusted positions. For example, the fixing or securing is stable longterm and is climate-resistant. The method should therefore be particularly capable of being utilized in the manufacture of optical transmitter modules and in the manufacture of plug parts for releasable plug connections of light waveguides.

To obtain these objects, the method is directed to an improvement is method for connecting elements of optical communication technology to one another or to elements of releasable plug connections wherein the elements to be connected are first secured to allocated weldable adjustable members, the adjustable members are then displaced relative to one another with coupling faces lying against one another without play until the desired adjusted position is reached and subsequently the adjusted members are connected to one another in the region of a part seam formed by edges of the coupling faces by welding. The improvements are that the step of welding adjustment members includes forming at least one spot weld by utilizing a beam welding process selected from a group consisting of laser beam welding and electron beam welding and that at least the first spot weld is positioned on a portion of the part seam so that an interval remains between the melting zone of the first spot weld and a circle circumscribing the coupling face contour.

The elements to be fixed or connected to one another such as a laser diode and a coupling optics or optical fibers and plug cylinders are thus first secured to weldable adjustment members which are connected to one another by at least one spot weld after a desired adjusted position has been reached. The spot weld is formed by means of a laser beam or an electron beam so that the only extremely small regions of the adjusted members are briefly heated and accordingly the thermal warping is extremely low. Since the coupling faces of the adjusted members lie against one another without play, the adjustment members can be brought into an exact adjusted position in a fashion similar to stacking gauge blocks and can be fixed in this position. In order to guarantee a three-dimensional weld warping of less than 0.2 $\mu$m and to be able to realize corresponding high fixing precision, it is of decisive importance that at least the first spot weld be positioned so that the interval remains between the melting zone and a circle, which circumscribes the coupling face contour. The spot weld is thus placed so that the melting zone does not contact or touch the circle circumscribing the coupling face contour. This measure is based on the perception that even given a microfinishing of the coupling faces, the part seam formed at the edges of the coupling surfaces can have a gap or slight separation somewhat at its peripheral area and a spot weld placed at the location of the gap could lead to a welding warp when the melting zone cools. When at least the first spot weld is placed or positioned out of this peripheral danger area, then the part seam remains stable and a disturbing weld warp can be avoided.

In accordance with the particularly preferred development of the invention, at least the first two spots welds are positioned so that the interval remains between the melting zone and a circle, which circumscribes the coupling face contour. The danger of a welding warp due to further spot welds or seams, which may become necessary, is thereby further reduced.

This effort can further be enhanced when at least the first two spot welds are placed at a distance from the corner points of the coupling face contour. Accordingly, the spot welds are preferably placed in planar regions of the coupling face contour.

Adjustment members having planar coupling faces can be employed in the method of the invention. It is particularly advantageous, however, when the adjustment members have at least one coupling face which has a concave shape. The danger of weld warping is thereby further greatly reduced since the coupling faces are pressed against only one another without positional change when the melting zone cools. The other coupling face can thereby be a planar surface. The other coupling face however can also comprise a convex surface whereby the convex surface must have a greater radius of curvature than the radius of curvature of the concave surface so that the concave surface has a greater or sharper curvature than the curvature of the convex surface. Moreover, the radii of curvature of the coupling faces are dimensioned to be larger than the diameter of the circle, which circumscribes the coupling face, and the difference amounts to several orders of magnitude. This dimensioning means that the maximum width of the part seam is extremely small and, for example, amounts to only about 2 $\mu$m.

In accordance with the particularly preferred embodiment of the method of the invention, the adjustment members whose coupling face contours comprise different, particularly oppositely directed slopes of the edges at least in the region of the two first spot welds, are utilized. Such a design of the coupling face contour prevents dislocations caused by the adjustment operations from forming to welding steps between the end faces.

In addition, the dimensional precision achieved in the adjustment can be further enhanced when the adjustment members are pressed against one another with the force acting perpendicular to the coupling faces. The adjustment members are then expediently displaced relative to one another in small substeps of approximately 0.01 $\mu$m until the adjusted position is achieved.

A first modification of the idea underlying the method of the invention is concerned with a plug part for releasable plug connections of a light waveguide comprising a plug cylinder in which an optical fiber, particularly a monomode fiber, is centrally fixed. The object underlying the invention is thereby achieved wherein the optical fiber is secured in a central bore of the first adjustment member and the second adjustment member is secured in a plug cylinder, the first adjustment member and the second adjustment member abut one another without play with the coupling faces directed orthogonally relative to the longitudinal axis of the plug cylinder and the first adjustment member and the second adjustment member are connected to one another by at least one spot weld in the region of the part seam formed by the coupling faces. The adjustment members can thus be displaced relative to one another with coupling faces lying against one another free of play until the optical fiber is in the desired adjusted position and is aligned exactly centrally relative to the outside circumference of the plug cylinder. This position is then fixed by at least one spot weld. The coupling loss of the finished plug connection can be minimized by means of the time stable and climate-resistant fixing.

In a second modification of the idea underlying the method of the present invention is directed to an optical transmitter module comprising a laser diode, a coupling optics and a light waveguide, whereby the optical axis of the coupling optics is aligned relative to the optical axis of the laser diode in a prescribably adjusted position. In such an optical transmitter module, the object underlying the invention is achieved by securing the light waveguide and coupling optics in a first adjustable member, securing the second laser diode in the second adjustable member, positioning first and second adjustable members to lie against one another without play with coupling faces aligned orthogonally relative to the optical axis of the coupling optics and/or orthogonally relative to the optical axis of the laser diode, and subsequently connecting the first and second adjustment members to one another by at least one spot weld in the region of the parting seam between the edges of the coupling faces which is positioned inward of a circle circumscribing the profile of the coupling faces.

Hereto, the adjustment members can thus be displaced relative to one another with coupling faces lying against one another free of play until the laser diode and the coupling optics are aligned in the exact adjusted position relative to one another and this position is fixed by means of at least one spot weld. It is therefore particularly advantageous when the coupling optics and the light waveguide are fixed in the tubular fiber carrier and the fiber carrier is secured in a longitudinal guidance channel or groove in the first adjusted member. With the coupling faces of the adjustment members abutting one another, a desired distance between the coupling optics and the laser diode can then first be adjusted by dislocating the fiber carrier in the longitudinal guidance channel, whereby the fiber carrier is fixed in the first adjustment member and the other adjustments and fixings are then undertaken.

Sample embodiments of the invention shall be explained in greater detail below with reference to the drawings.

BRIEF DESCRIPTION OF THE DRAWINGS

FIGS. 1a–5a and 1b–5b represent two respective different views of different shaped adjustment members whose coupling face profiles enable an application of spot welds from a single welding beam direction with FIGS. 1a–5a being end views of the coupling faces of the difference members and FIGS. 1b–5b being side views of the connection of the two members of FIGS. 1a–5a, respectively;

FIGS. 6a–9a and FIGS. 6b–9b are two respective views of adjustment members whose coupling face profiles are provided for connecting welds having arbitrary welding directions wherein FIGS. 6a–9a are end views of the coupling faces of four different shaped adjustment members and FIGS. 6b–9b are side views of a welded connection between two respective members of FIGS. 6a–9a, respectively;

FIGS. 15 through 18 are cross-sectional views showing various steps in a process of forming a plug connection for light waveguides with FIG. 15 being a cross-sectional view of one adjustment member;

FIG. 21b is a side view of the profile a connection between two members of FIG. 21a.

DESCRIPTION OF THE PREFERRED EMBODIMENTS

For the purpose of connecting elements of optical communication technology to one another or to elements of releasable plug connections of the light waveguides, the elements to be connected are first secured to weldable adjustment members whereby the adjustment members are displaced relative to one another with coupling faces lying against one another without play until the desired adjusted position is reached. In order to permanently fix this adjusted position, the adjustment members are connected to one another by spot welds by means of laser beam welding in the region of the part seam formed by edges of the coupling faces. The spots welds however can also be produced by electron beam welding, however, the connection must then occur within a vacuum chamber. Since only small regions of the adjustment region are briefly heated both in laser beam welding process as well as electron beam welding process, the thermal warping is very slight. In order to achieve a warp-free spot weld fixing, however, certain demands are also made on the shape of the adjustment member and in particular on the position of the spot weld relative to the respective coupling face profile. In FIGS. 1a through 9a and 1b through 9b, exemplary embodiments of suitable coupling face profiles for the adjustment member wherein the part seams are respectively referenced Tf, the spot welds are respectively reference Sp and the circles which circumscribe the coupling face contour are respectively referenced K. It may be seen that all spot welds Sp are placed such that a certain interval always remains between the melting zone of the spot weld and the circle K which circumscribes the coupling face contour. The melting zone of the spot weld Sp thus does not touch the circle K in any case. The position of the spot weld Sp further is also based on the existing symmetry of the coupling face contour.

In the embodiments illustrated in FIGS. 1a through 9a, the welding beam direction during application of the spot weld Sp is shown by unnumbered arrows. It may be seen that all spot welds in the exemplary embodiments of FIGS. 1a through 5a can be formed from a single welding beam direction whereas the arbitrary beam directions are utilized in the embodiments illustrated in FIGS. 6a through 9a.

Figure 1A:
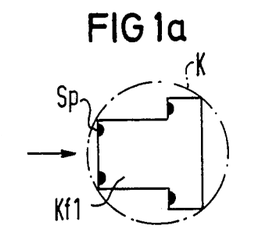
Figure 1B:
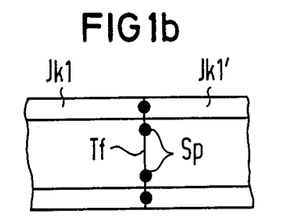

In the embodiment illustrated in FIGS. 1a and 1b, adjustment members Jk1 and Jk1' have coupling faces Kf1 which have a T-shaped profile. The connection of the two adjustment members Jk1 and Jk1' occurs by means of a total of four spot welds Sp placed in the region of the part seam Tf. Two spot welds are situated in the underside of the T-shaped projections whereas the two other spot welds lie in the region of the base area of the T-profile. It is noted, however, that each of these spot welds is positioned inward from a corner and does not lie on the circle K.

Figure 2A:
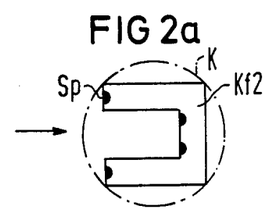
Figure 2B:
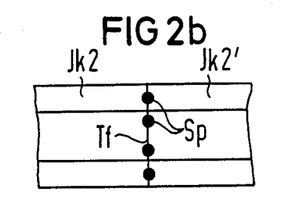

In the embodiment illustrated in FIGS. 2a and 2b, adjustment members Jk2 and Jk2' have coupling faces Kf2 which are fashioned with a U shape. The connection of the two adjustment members Jk2 and Jk2' occurs by means of a total of four spot welds Sp placed in the region of the part seam Tf. One spot weld is situated on each end face of the legs of the U-shaped profile whereas the other two spot welds lie in the region of the floor of the channel forming the bight portion of the U-shaped profile.

Figure 3A:
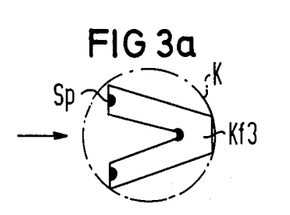
Figure 3B:
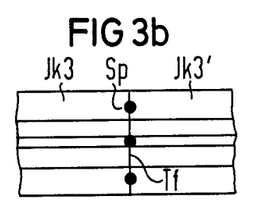

In the embodiment illustrated in FIGS. 3a and 3b, adjustment members Jk3 and Jk3' have coupling end faces Kf3, which are respectively fashioned with a V shape. The connection of the two adjustment members Jk3 and Jk3' occurs by means of a total of three spot welds Sp placed in the region of the part seam Tf. One spot weld Sp is situated at each end face of the legs of the V-shaped profile whereas the third spot weld lies in the base or notch of the incision of the V-shaped profile.

Figure 4A:
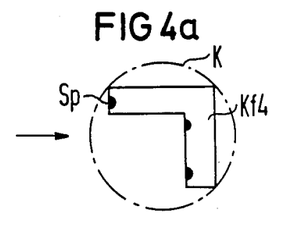
Figure 4B:
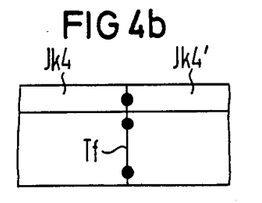

In the embodiment illustrated in FIGS. 4a and 4b, adjustment members Jk4 and Jk4' have coupling faces Kf4 which have an L-shaped profile. The connection of the two adjustment members Jk4 and Jk4' occurs by means of a total of three spot welds placed in the region of the part seam Tf. One spot weld is situated at the end face of the legs of the L-shaped profile whereas the other two spot welds lie on the inside surface of the other leg.

Figure 5A:
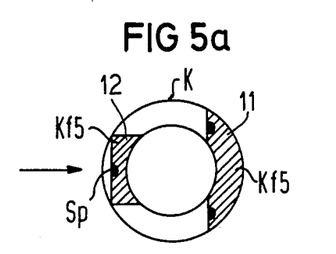
Figure 5B:
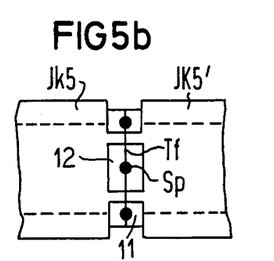

Another embodiment of the adjustment members Jk5 and Jk5' as illustrated in FIGS. 5a and 5b are tubular members having an annular profile or cross-section. At the end faces Kf5, the tubular members Jk5 has been machined or worked to form two space-apart segements or portions 11 and 12. As illustrated, the two adjustment members Jk5 and Jk5' are connected by means of a total of three spot welds in the region of the part seam Tf between the two coupling faces. One spot weld Sp is situated in each of the end faces of the flat annular segments of the portion 11 while the third spot weld lies in the center of a flattened surface of the portion of segment 12. The two portions 11 and 12 as mentioned hereinabove were formed by machining the annular cross-section of the members Jk5 and Jk5' are provided surfaces which have positions for the spot welds Sp which are spaced inwardly from the outer diameter of the members Jk5 and Jk5' which forms the circle K.

Figure 6A:
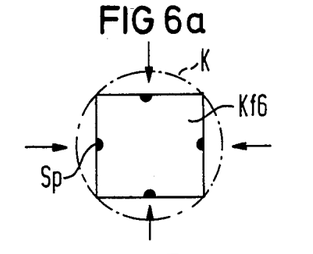
Figure 6B:
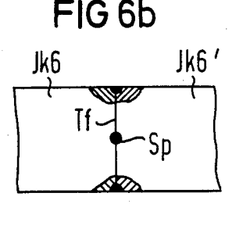

The embodiment of the adjustment members Jk6 and Jk6' illustrated in FIGS. 6a and 6b have a quadrilateral or square cross-section with the coupling faces Kf6 having this square or rectangular profile. The connection of the two adjustment members Jk6 and Jk6' occurs by means of a total of four spot welds Sp placed in the region of the part seam Tf with one spot weld Sp being situated in the center of each side of the quandrilateral profile.

Figure 7A:
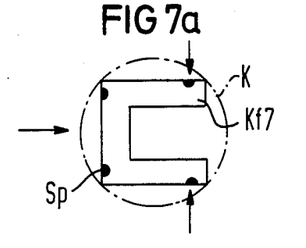
Figure 7B:
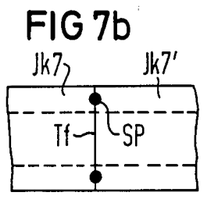

In an embodiment illustrated in FIGS. 7a and 7b, the two adjustment members Jk7 and Jk7' have a U-shaped profile for the coupling face Kf7. The connection of the two adjustment members Jk7 and Jk7' occurs by means of a total of four spot welds placed in the region of the part seam Tf with one spot weld occurring in the region of a lateral face of the leg of the U-shaped profile and the two other spot welds lying in the region of the outer surface of the base area or bight portion of the U-shaped profile.

Figure 8A:
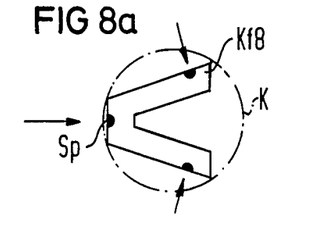
Figure 8B:
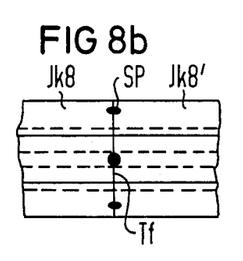

Another embodiment of the adjustment members Jk8 and Jk8' is illustrated in FIGS. 8a and 8b and have coupling faces Kf8 which have a V-shaped profile. The connection of the two adjustment members Jk8 and Jk8' occurs by means of a total of three spot welds Sp placed in the region of the part seam Tf. One spot weld Sp is situated in each lateral face of the legs of the V-shaped profile whereas the third spot weld lies in the region of the outer surface of the base area of the V-profile.

Figure 9A:
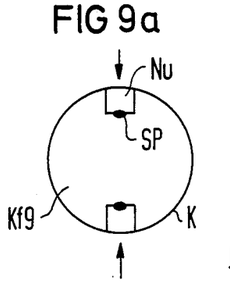
Figure 9B:
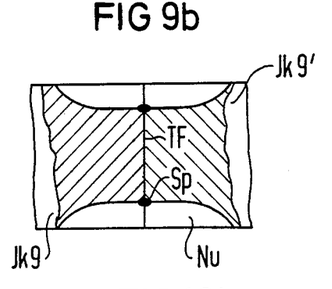

In the embodiment illustrated in FIGS. 9a and 9b, adjustment members Jk9 and Jk9' have a coupling face Kf9 with a circular profile with an outer diameter being the circle K which circumscribes the coupling face being formed by this outer circumference. Two grooves Nu with flat bases are formed to extend in a longitudinal direction on opposite sides of the members Jk9 and Jk9'. The connection of the two adjustment members Jk9 and Jk9' occurs by means of a total of two spot welds Sp placed in the region of the part seam Tf. One of the spot welds Sp is situated at the base or floor of each of the grooves Nu.

Figure 10A:
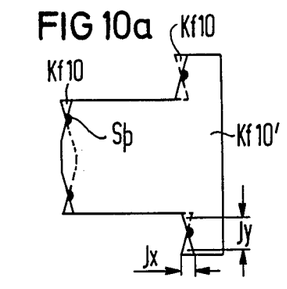
FIGS. 10a and 10b are two views of adjustment members whose coupling face profiles are fashioned such that the welding steps between the coupling faces are avoided with FIG. 10a being an end view of the connection of the two members and FIG. 10b being a side view of the connection.
Figure 10B:
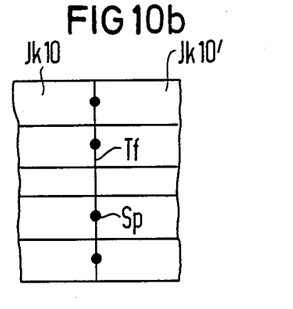

An embodiment of the adjustment members is shown by the adjustment members Jk10 and Jk10' in FIGS. 10a and 10b and these adjustment members have coupling faces Kf10 and Kf10', respectively, which are fashioned such that the dislocations caused by adjustment operations cannot lead to welding steps between the coupling faces. The profile of the coupling faces Kf10 and Kf10' are basically T-shaped but are modified so that the edges at the underside of the T-shaped projections and at the two locations of the region of the base area of the T-profile slope in opposite directions. The total of four spot welds Sp provided in the region of the part seam Tf can thereby also be respectively placed in the intersection of the oppositely directed edges even after a displacement in the region of the adjustment paths Jx and Jy without any welding steps occurring between the faces.

Figure 11:
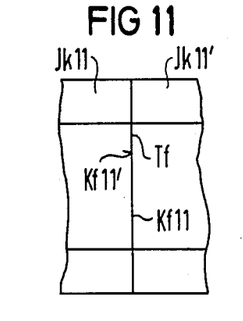
FIG. 11 is a side view of the connection of two adjustment members having planar coupling faces.

The coupling faces of the adjustment members must lie against one another without play in the adjustment operation. In accordance with the embodiment illustrated in FIG. 11, this is achieved by the two adjustment members Jk11 and Jk11' which are to be connected to one another having planar coupling faces Kf11 and Kf11' which lie against one another. The coupling faces Kf11 and Kf11' should thereby be so finely worked that no gaps occur in the peripheral region of the part seam Tf insofar as possible. However, it is also favorable for an absolute play-free adjacency of the coupling faces when at least one coupling face comprises a concave shape.

Figure 12:
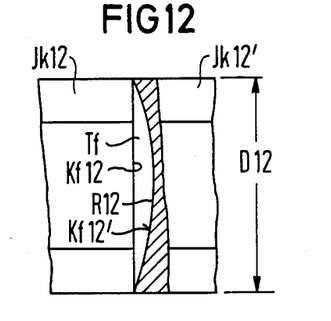
FIG. 12 is a side view with portions broken away of a connection between two adjustment members with one having a planar coupling face and the second having a concave coupling face.

In accordance with the embodiment illustrated in FIG. 12, pairing is possible wherein one of the adjustment members Jk12 comprises a planar coupling face Kf12 whereas the other adjustment member Jk12' has a concavely arced coupling face Kf12'. The adjustment members Jk12 and Jk12' then lie against one another only in the peripheral region of the coupling face Kf12 and Kf12'. When the concave coupling face Kf12' has a radius of curvature R12 and the diameter of the circle which circumscribes the coupling face Kf12 and Kf12' has a diameter D12, then D12 is considerably less than R12. This means the maximum width of the parting seam Tf is extremely small and, for example, only amounts to about 2 $\mu$m.

Figure 13:
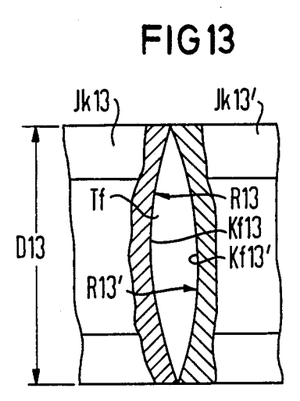
FIG. 13 is a side view with portions broken away of a connection between two adjustment members both having concave-shaped coupling faces.

In the embodiment illustrated in FIG. 13, the adjustment members Jk13 and Jk13', respectively, have concavely arced coupling surface Kf13 ad Kf13'. The adjustment members Jk13 and Jk13' likewise lie against one another only in the peripheral region of the coupling faces Kf13 and Kf13'. The coupling face Kf13 has a radius of curvature R13 and the coupling face Kf13' has a radius of curvature R13'. The diameter of a circle which circumscribes the coupling faces Kf13 and Kf13' is a diameter D13 which is considerably less than either R13 or R13'. This means that the maximum width of the parting seam Tf is also extremely small and, for example, only amounts to about 2 μm.

Figure 14:
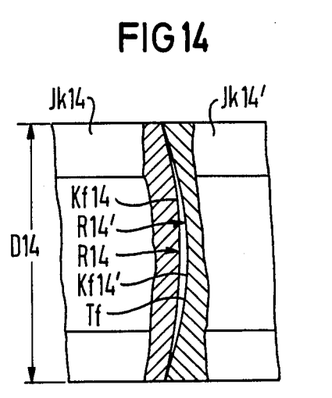
FIG. 14 is a side view with portions broken away for purposes of illustration of a connection between two adjustment members, one having a coupling face with a convex shape and the other having a coupling face comprising a concave shape.
Figure 15:
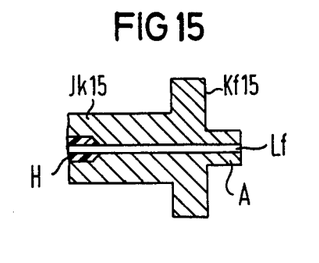

In another embodiment as illustrated in FIG. 14, the adjustment member Jk14 comprises a convex coupling face Kf14 which has a radius of curvature R14 and the other adjustment member Jk14' has a concavely arced coupling face Kf14' with a radius of curvature R14'. The circle which circumscribes the coupling faces Kf14 and Kf14' has a diameter D14. As illustrated, the radius of curvature R14' is smaller than the radius of curvature R14 and the diameter D14 is considerably less than either of the radius R14 and R14'. This means that hereto the adjustment members Jk14 and Jk14' abut only one another in a peripheral region of the coupling face Kf14 and Kf14' and the maximum width of the part seam Tf is also extremely small, for example, about 2 μm.

Figure 16:
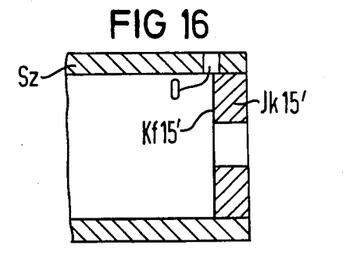
FIG. 16 being a partial cross-sectional view of the second adjustment member secured in a tubular member.
Figure 17:
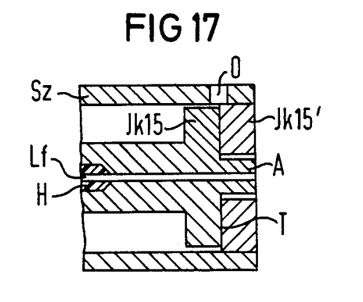
FIG. 17 being a cross-sectional view of the first adjustment member positioned in the second adjustment member.
Figure 18:
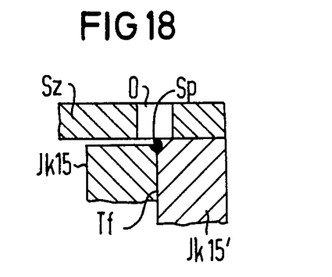
FIG. 18 being an enlarged partial cross-sectional view illustrating a spot weld between the two adjustment members.

The principles of the present invention can be utilized in manufacturing a plug part for a releasable plug connection of light waveguides. These steps of manufacturing are illustrated in FIGS. 15 through 18 with FIG. 15 being an end region of an optical fiber Lf stripped of its covering H being secured in a central bore of a first adjustment member Jk15. This fastening or securing can be unders taken, for example, with the assistance of a thin adhesive layer and the first adjustment member Jk15 is fashioned such that a coupling face Kf15 is set back relative to the end face of the optical fiber Lf which is in a projection A. A second adjustment member Jk15' has a second coupling face Kf15' and as illustrated in FIG. 16 is a member received in a hollow cylindrical tube or plug Sz. The coupling face Kf15' of the second adjustment member Jk15' is subjected to a microfinishing before the second adjustment member Jk15' is secured in the plug cylinder Sz by means of, for example, laser beam welding. As illustrated in FIG. 17, the first adjustment member Jk15 is then inserted into the plug cylinder Sz and the coupling faces Kf15 and Kf15' are brought against one another. The dimensions are selected so that the radial play between the outer profile of the first adjustment member Jk15 and the inside circumference of the plug cylinder Sz and between the cylindrical projection A of the first adjustment member Jk15 and the inside bore of the second adjustment member Jk15' are substantially the same. The adjustment member Jk15 and Jk15' are then pressed against one another with a slight force acting perpendicular to the coupling faces Kf15 and Kf15' and are shifted relative to one another in small substeps of about 0.01 μm until the desired adjusted position is reached in which the core of the optical fiber Lf is aligned exactly centrally relative to the outside circumference of the plug cylinder Sz. After this adjusted position has been reached, the first adjustment member Jk15 and the second adjustment member Jk15' are then connected to one another by a plurality of spot welds Sp in the region of the part seam Tf formed by the coupling faces Kf15 and Kf15' as illustrated in FIG. 18. The spot welds are produced by a laser beam welding and can be placed through corresponding openings O which were arranged offset over the circumference of the plug cylinder Sz with a uniform spacing. It should be noted that the shaping of the faces Kf15 and Kf15' as well as for the coupling face contours and for the position of the spot welds Sp should be in accordance with the previously described embodiments illustrated in FIGS. 1 through 14 of the application. Thus, the faces Kf15 and Kf15' must have a profile difference than a circle and/or annular profile.

For the production of complete plug connection for light waveguides, two of the plug parts manufactured in accordance with the above description are inserted into a common sleeve and are pressed against one another such that the end faces of the optical fiber Lf previously ground planar with the end face of the projection A press against one another. It is thereby guaranteed due to the exact adjustment and fixing that the optical fibers Lf to be coupled are aligned in exact alignment and the coupling losses are accordingly minimized.

Figure 19:
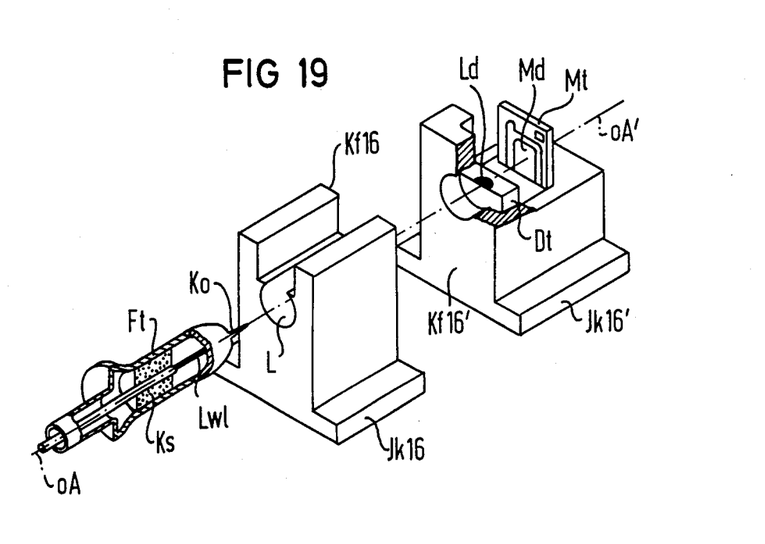
FIG. 19 is an exploded perspective view of an assembly for connecting an optical transmitter module to an optical waveguide.
Figure 20:
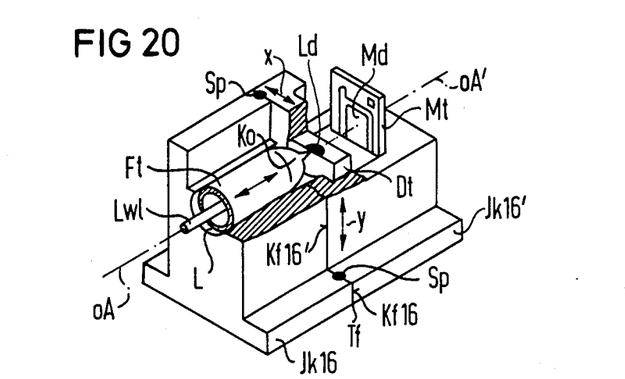
FIG. 20 is a perspective view with portions broken away for purposes of illustration of the assembly for an optical transmitter module to an optical waveguide.

A manufacturing of the optical transmitter module is illustrated in a greatly simplified manner schematically in FIGS. 19 and 20. It may be seen from an exploded or separated view of FIG. 19 that alight waveguide Lw1 and a coupling optics Ko are fixed in a tubular fiber carrier Ft. The fixing of the light waveguide Lw1 stripped of its covering in the leading region occurs by means of gluing the covering in the tube Ft by an adhesive layer Ks. A taper is applied to the front end of the light waveguide Lw1 as a coupling optic Ko and the tip of this taper is rounded to form a small lens projecting from the tubular fiber Ft only for a short distance. Shortly before the taper, the light waveguide Lw1 is likewise fixed by gluing or by soldering or by glazing in a central bore of the fiber carrier Ft.

A first adjustment member Jk16, which comprises a T-shaped cross-section may be seen as a seen as a second part in a dismantled illustration of FIG. 19. A longitudinal guuidance channel L for the tubular fiber carrier Ft is introduced or formed into the first adjustment member Jk16 and is illustrated as a stepped U-profile. One of the faces of the adjustment Jk16 is, for example, finely worked by lapping and it can serve as a coupling face Kf16. The contour and shape of the coupling face Kf16 thereby essentially corresponds to the contour and shape of the coupling face Kf1 shown in FIG. 1a.

A second adjustment member Jk16' may be seen as a third part in the view of FIG. 19 and this second adjustment member Jk16' likewise comprises a T-shaped cross-section and has a coupling face Kf16' allocated to the coupling face Kf16. A diode carrier Dt, which simultaneously serves as a heat sink, is orthogonally aligned relative to the coupling face Kf16'. Further a monitor diode carrier Mt is secured by soldering or gluing to the second adjustment member Jk16' and this monitor diode carrier Mt carries a monitor diode referenced Md.

The assembly or manufacture of the optical transmitter module shown in FIG. 20 is as follows. The first adjustment member Jk16 is clamped to a table top or to a plane carrier. The second adjustment member Jk16' is placed in a gripper which presses the coupling faces Kf16 and Kf16' against one another with a low force. The tubular fiber carrier Ft is introduced into the longitudinal guidance channel L of the first adjustment member Jk16 and an adjustment of the interval between the coupling optics Ko and the laser diode Ld, whereby the optical axis oA of the coupling optics Ko is aligned orthogonally relative to the coupling face Kf16. The laser diode Ld is adjusted with respect to the coupling optics Ko by the displacement of the second adjustment member Jk16' in the horizontal x-direction and the vertical y-direction. The tubular carrier Ft is fastened an the first adjusted member Jk16 by means of laser welding. Then a final adjusting of the laser diode Ld with respect to the coupling optics Ko is made by displacing the second adjustment member Jk16' in a horizontal x-direction and a vertical y-direction; and subsequently the two adjustment members Jk16 and Jk16' are connected or secured together by means of a laser beam welding with a total of four spot welds Sp placed in the region of the part seam Tf.

It should be noted that the discussions of the various embodiments illustrated in FIGS. 1a, 1b and 11 through 14 also apply for shaping the coupling faces Kf16 and Kf16' as well as for the coupling face contours and for the position of the spot welds Sp.

The optical transmitter module shown in FIG. 20 can be subsequently inserted into a housing or can already be assembled in a housing. Adjustment and fixing precision of about 2 um are adequate for the spacing between the coupling optics Ko and the laser diode Ld. Adjustment and fixing precision of about ±0.1 μm can be achieved in both the x-direction and the y-direction.

Figure 21A:
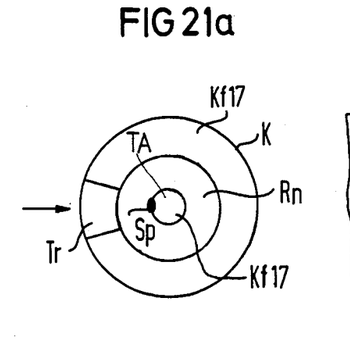
FIG. 21a is an end view of a coupling face of an adjustment member in accordance with the present invention.
Figure 21B:
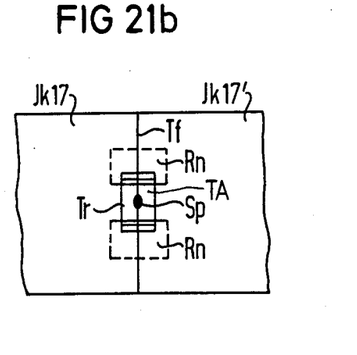

Another embodiment of the adjustment members Jk17 and Jk17' are illustrated in FIGS. 21a and 21b. The adjustment members Jk17 and Jk17' have coupling faces Kf17 which enable the connection to be accomplished by a single spot weld Sp. To this end, an annular groove Rn and a slot-like funnel Tr are milled into the circular coupling face Kf17 of each member Jk17 and Jk17' to form a center projection JA. The circle K which circumscribes and the coupling face Kf16 is formed by the outer circumference of the adjustment member Jk17. The connection of the two adjustment members Jk17 and Jk17' occurs exclusively by the single spot weld, which is formed by directing a laser beam as indicated by the arrow through the funnel Tr and the annular groove Rn. The spot weld Sp is placed in the region of the part seam Tf of the projection TA and is thereby situated on the inside circumference of the annular groove Rn or, respectively, at the outside circumference of the circular center projection TA of the coupling face Kf17.

Although various minor modifications may be suggested by those versed in the art, it should be understood that I wish to embody within the scope of the patent granted hereon, all such modifications as reasonably and properly come within the scope of my contribution to the art.

The embodiments illustrated in FIGS. 12, 13 and 14 and in FIGS. 15 through 18 differ from the real form of contruction for purposes of easy illustration.

In the embodiments illustrated in FIGS. 12, 13 and 14 the distances between the coupling faces Kf12 and Kf12' Kf13 and Kf13'; and Kf14 and Kf14' are as a matter of fact to a high degree smaller than shown for purposes of demonstration. In reality these distances, which reach for instances a maximum of 1 μm, are not visible. Due to this minor distances the spot welds inwardly spaced from a circle according to the diameters D12, D13 and D14, respectively, will bridge the coupling faces and draw them together by shrinking. A suitable shape of the parts and suitable locations of the spot welds Sp are shown in FIGS. 1a and 1b.

In the embodiment of the plug connection illustrated in FIGS. 15 through 18 the shoulder of the part Jk15 and the part Jk15' appear as annular parts and according to FIG. 18 the spot weld Sp seems to be located on the circle K. In actual fact the shoulder of the part Jk15 and the part Jk15' will have a shape suitable to locate at least the first spot weld Sp inwardly of the circle K. Proper shapes of the parts Jk15 and Jk15' are shown in FIGS. 5a and 5b or in FIGS. 9a and 9b or in FIGS. 21a and 21b.

I claim:

1. In a method for connecting elements of optical communications technology to one another by a method which includes securing the elements to weldable adjustment members, displacing the adjustment members relative to one another with the coupling faces lying against one another without play until the desired adjusted position is reached between the elements and subsequently welding the adjustment members to one another in the region of the part seam formed by edges of the coupling faces, the improvements comprising the step of welding the adjustment members together includes forming at least one spot weld by a beam welding process selected from a group consisting of laser beam welding and electron beam welding and includes positioning the first spot weld on a portion of the part seam inwardly spaced from a circle which circumscribes the coupling face contour so that an interval exists between the melting zone of the spot weld and said circle.

2. In a method according to claim 1 which includes positioning the first two spot welds inward of said circle so that an interval remains between the melting zone and the circle.

3. In a method according to claim 2, wherein the step of positioning the first two spot welds positions them at a distance from corner points on the coupling face contour.

4. In a method according to claim 3 which includes forming planar coupling faces on each of the adustment members.

5. In a method according to claim 3 which includes forming coupling faces on each of the adjustment members with at least the coupling face on one of the members having a concave shape.

6. In a method according to claim 5, wherein the radius of curvature of the coupling face having a concave shape is greater than the diameter of the circle which circumscribes the coupling faces with the difference amounting to a plurality of orders of magnitude.

7. In a method according to claim 5, wherein the step of forming the coupling faces on the other adjustment member comprises forming a planar surface.

8. In a method according to claim 7, wherein the step of forming the concave coupling face forms a coupling face having a radius of curvature greater than the diameter of the circle which circumscribes the coupling face with the difference amounting to a plurality of orders of magnitude.

9. In a method according to claim 5, wherein the step of forming the coupling face of the other adjustment member forms a convex surface with the radius of curvature of the convex surface being greater than the radius of curvature of the concave surface.

10. In a method according to claim 9, wherein the radius of curvature of the concave and convex surfaces are greater than the diameter of the circle which circumscribes the coupling faces with the difference amounting to a plurality of orders of magnitude.

11. In a method according to claim 2 which includes forming coupling faces having edges with different slopes at least in the regions for each of the first two spots welds.

12. In a method according to claim 11, wherein the different slopes of the edges of the coupling face contours extend in opposite directions.

13. In a method according to claim 1, wherein the steps of bringing the two coupling faces together includes pressing the coupling faces together with a force acting perpendicular to the coupling faces.

14. In a method according to claim 13, wherein the step of adjusting the position of the adjustment members shifts the members relative to one another in small sub-steps of 0.01 $\mu$m until the adjustment position is reached.

15. A plug part for a releasable plug connection of light waveguides comprising a plug cylinder in which an optical fiber with a longitudinal axis is centrally fixed, said plug cylinder including a first adjustment member having a central bore receiving the optical fiber, a second adjustment member being secured in the plug cylinder, the first and second adjustment members having coupling faces being directed orthogonally relative to the longitudinal axis of the fiber and the axis of the plug cylinder and abutting one another without play, and the first and second adjustment members being connected to one another by at least one spot weld in a region of a part seam formed by edges of the coupling faces, said spot weld being positioned inwardly of a circle circumscribing the profile of said coupling faces.

16. An optical transmitter module comprising a laser diode, a coupling optics and a light waveguide, wherein the optical axis of the coupling optics is aligned in a prescribable adjusted position relative to the optical axis of the laser diode, said module including a first adjustment member receiving the light waveguide and the coupling optics, a second optical adjustment member receiving the laser diode, said first adjustment member and said second adjustment member each having coupling faces aligned orthogonally relative to the optical axis of the coupling optics and of the laser diode, respectively, said first and second adjustment members being positioned with the coupling faces lying against one another without play and being connected to one another by at least one spot weld in a region of a part of seam formed by edges of the coupling faces spaced inwardly from a circle circumscribing the profile of the coupling faces.

17. An optical transmitter module according to claim 16, wherein the coupling optics and the light waveguide are fixed in a tubular fiber carrier, and said first adjustment member having a longitudinal guidance channel receiving the tubular fiber carrier.

* * * * *